United States Patent
Kawakami et al.

(10) Patent No.: US 9,587,770 B2
(45) Date of Patent: *Mar. 7, 2017

(54) α + β TYPE TITANIUM ALLOY SHEET FOR WELDED PIPE, MANUFACTURING METHOD THEREOF, AND α + β TYPE TITANIUM ALLOY WELDED PIPE PRODUCT

(71) Applicant: NIPPON STEEL & SUMITOMO METAL CORPORATION, Tokyo (JP)

(72) Inventors: Akira Kawakami, Tokyo (JP); Kazuhiro Takahashi, Tokyo (JP); Hideki Fujii, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 14/366,239

(22) PCT Filed: Dec. 19, 2012

(86) PCT No.: PCT/JP2012/082954
§ 371 (c)(1),
(2) Date: Jun. 17, 2014

(87) PCT Pub. No.: WO2013/094647
PCT Pub. Date: Jun. 27, 2013

(65) Prior Publication Data
US 2015/0292650 A1  Oct. 15, 2015

(30) Foreign Application Priority Data
Dec. 20, 2011  (JP) ................................ 2011-278281

(51) Int. Cl.
*B21B 3/00* (2006.01)
*C22C 14/00* (2006.01)
(Continued)

(52) U.S. Cl.
CPC ........ *F16L 9/17* (2013.01); *B21B 3/00* (2013.01); *C22C 14/00* (2013.01); *C22F 1/183* (2013.01)

(58) Field of Classification Search
CPC ... C22F 1/00; C22C 14/00; B21B 1/26; B21B 3/00
See application file for complete search history.

(56) References Cited

U.S. PATENT DOCUMENTS

2008/0011395 A1* 1/2008 Matsumoto ............ C22C 14/00
148/670
2012/0234066 A1  9/2012 Takahashi et al.

FOREIGN PATENT DOCUMENTS

| EP | 2 508 643 A1 | 10/2012 |
|---|---|---|
| JP | 59-215450 A | 12/1984 |

(Continued)

OTHER PUBLICATIONS

International Search Report issued in PCT/JP2012/082954, dated Feb. 5, 2013.
(Continued)

*Primary Examiner* — Jie Yang
*Assistant Examiner* — Xiaowei Su
(74) *Attorney, Agent, or Firm* — Birch, Stewart, Kolasch & Birch, LLP

(57) ABSTRACT

An α+β type titanium alloy sheet to be used for a welded pipe with a rolling direction of the sheet set to a circumference direction of the pipe includes: a composition containing, in mass %, 0.8 to 1.5% of Fe, 4.8 to 5.5% of Al, 0.020% or less of N, O in a range satisfying Q=0.14 to 0.38, and a balance being composed of Ti and impurities, in which a texture in a sheet plane direction has: a first group of grains oriented in a region where of a (0002) pole figure of an α phase having a hexagonal crystal structure, an angle θ being the angle between a c axis and a sheet normal direction is 0 to 30°; and a second group of grains oriented in a region
(Continued)

where the angle θ is 80 to 100° and of the (0002) pole figure of the α phase, an angle φ being the angle between a projection line of the c axis onto the sheet plane and a sheet width direction is −10 to 10°, and a ratio of peak values of X-ray relative intensities from a basal plane in the α phase between the first group of grains and the second group of grains (the second group of grains/the first group of grains) is 5.0 or more.

3 Claims, 3 Drawing Sheets

(51) Int. Cl.
*F16L 9/17* (2006.01)
*C22F 1/18* (2006.01)

(56) References Cited

FOREIGN PATENT DOCUMENTS

| JP | 61-159562 A | 7/1986 | | |
|---|---|---|---|---|
| JP | 2-34752 A | 2/1990 | | |
| JP | 7-62474 A | 3/1995 | | |
| JP | 9-228014 A | 9/1997 | | |
| JP | 2000-158141 A | 6/2000 | | |
| JP | 2001-115222 A | 4/2001 | | |
| JP | EP 1163969 A1 * | 12/2001 | ............. | C22C 14/00 |
| JP | 2004-10963 A | 1/2004 | | |
| JP | 2005-220388 A | 8/2005 | | |
| JP | 2007-270199 A | 10/2007 | | |
| JP | 4486530 B2 | 6/2010 | | |
| JP | 4516440 B2 | 8/2010 | | |
| JP | 4855555 B2 | 1/2012 | | |
| JP | 2012-57200 A | 3/2012 | | |
| WO | WO 2011/06824 A1 | 6/2011 | | |
| WO | WO 2012/115243 A1 | 8/2012 | | |

OTHER PUBLICATIONS

Seishi Ishiyama, "Plastic Deformation and Press Formability of C.P. Titanium Sheet", The Japan Titanium Society, Apr. 28, 2006, pp. 42-51, vol. 54, No. 1.

* cited by examiner

α + β TYPE TITANIUM ALLOY SHEET FOR WELDED PIPE, MANUFACTURING METHOD THEREOF, AND α + β TYPE TITANIUM ALLOY WELDED PIPE PRODUCT

TECHNICAL FIELD

The present invention relates to an α+β type titanium alloy for welded pipe excellent in pipe-making properties and excellent in strength and rigidity in a pipe longitudinal direction and a manufacturing method thereof, and further relates to an α+β type titanium alloy welded pipe product.

BACKGROUND ART

An α+β type titanium alloy has been used since old days as components of aircrafts and the like by using its high specific strength. In recent years, the weight ratio of a titanium alloy to be used for aircrafts is increasing and the titanium alloy becomes important increasingly. Also in a consumer product field, an α+β type titanium alloy characterized by a high Young's modulus and light specific gravity is often used for usage for golf club faces. Further, a high-strength α+β type titanium alloy is partially used for automobile parts whose reduction in weight is regarded as important, geothermal well casings and riser pipes for offshore oil wells that require corrosion resistance and specific strength, or the like, and its further application expansion is expected.

An α+β type titanium alloy pipe product has excellent corrosion resistance and high strength, to thus be used for energy usage of the above-described geothermal well casings, pipes of oil wells, and the like. Further, a heat resistance alloy pipe product having high specific strength and having excellent high-temperature strength is used for exhaust pipes of automobiles and the like. Further, the application of the α+β type titanium alloy pipe product to strength members such as frames of high-grade automobiles and motorcycles and reinforcing members by use of its high specific strength is also promising. For this usage, strength and rigidity in the pipe longitudinal direction need to be high, and particularly, tensile strength is desirably 1050 MPa or more and a Young's modulus is desirably 130 GPa or more. Further, low manufacturing cost is more required than in the other usages.

As a method of obtaining this α+β type titanium alloy pipe, a method of manufacturing a seamless pipe using a skew rolling process is described in Patent Document 1 and Patent Document 2. In Patent Document 1, hot rolling conditions are defined and annealing is performed at a temperature equal to or higher than a β transus, and thereby fracture toughness improvement is intended. However, when annealing is performed at the β transus or higher, complete acicular structure is made and in a pipe longitudinal direction and in a circumference direction, strength and an elastic modulus become the same on a not very high level, thereby making it difficult to achieve high strength and high rigidity in the pipe longitudinal direction that is intended in the present invention.

Further, in Patent Document 2, large shear strain is introduced into the surface of a material, so that in a skew rolling process in which hot working severe for a material to be hot rolled is performed, a hot working temperature in each step is defined for the purpose of securing hot workability of the material. In this case as well, a hot-rolling texture that causes the strength in a pipe longitudinal direction high cannot be obtained, resulting in that it is difficult to achieve high strength and high rigidity in the pipe longitudinal direction that is intended in the present invention.

There is a method of obtaining a seamless pipe by a hot extrusion process using a Ugine-Sejournet process or the like other than the skew rolling process. Even by all the processes, however, it is difficult to obtain a texture capable of obtaining high strength and high rigidity in the pipe longitudinal direction. Further, as compared to a process of manufacturing a welded pipe product by bending a sheet-shaped material, productivity is low generally, so that there is also a problem of high manufacturing cost.

Next, as the method of obtaining the α+β type titanium alloy pipe, in Patent Document 3 and Patent Document 4, there is described a method in which a sheet-shaped material obtained by hot rolling or further cold rolling is subjected to bending and butt portions thereof are welded by TIG, MIG, EB, plasma arc, or the like, to thereby manufacture a welded pipe. In the both cases, as compared to the skew rolling or hot extrusion process, productivity is high, and further production yield is high because machining some portions where wall thickness is uneven, which can be often seen in a seamless pipe, is unnecessary, resulting in that it is possible to reduce the manufacturing cost.

Patent Document 3 does not require large volume cutting by defining thickness tolerance of the welded pipe to be small to thereby suppress uneven thickness in Ti-3% Al-2.5% V and Ti-6% Al-4% V (% means mass %, which will be omitted, hereinafter). Further, similarly to Patent Document 1, Patent Document 3 intends to increase the fracture toughness by obtaining a β annealed microstructure. Thus, in this case as well, the strength in the pipe longitudinal direction and the strength in the circumference direction become similar and large anisotropy in mechanical properties does not appear, so that it is difficult to achieve high strength and high rigidity in the pipe longitudinal direction that is intended in the present invention.

Further, in Patent Document 4, it is described that when a coiled sheet material called hoop is used to manufacture a titanium or titanium alloy welding pipe continuously by a roll forming method, plural welding torches are used, to thereby make it possible to achieve no defect in a weld zone and production efficiency improvement. Although in this process, the material hoop in the sheet width direction is curved to manufacture the welded pipe, the sheet width direction is not the direction in which the strength and the rigidity in the pipe longitudinal direction are increased, which will be described later.

Further, in Patent Document 5, Patent Document 6, and Patent Document 7, a heat resistant titanium alloy to be used for exhaust pipes of automobiles and motorcycles is disclosed. These alloys are each characterized by being excellent in high-temperature strength and oxidation resistance and being excellent in cold workability. However, each tensile strength at room temperature of these alloys is 400 to 600 MPa or so, and thus it is not possible to obtain 1050 MPa or more of room temperature tensile strength in the pipe longitudinal direction, which is necessary for frames of high-grade motorcycles and bicycles, strength members of automobiles, and the like.

In Non-Patent Document 1, there is described an example of the relationship between in-plane anisotropy in strength and a texture in pure titanium, and it is described that as compared to Basal-texture, (which is a texture in which a basal plane of titanium α phase, HCP, is accumulated in the normal direction of a sheet or in the direction close to the normal direction of the sheet to be referred to as B-texture, hereinafter), in-plane anisotropy in yield stress is large in Transverse-texture, (which is a texture in which a c axis orientation being the normal direction of a (0001) plane being a titanium α phase, HCP, is strongly oriented in the sheet width direction (perpendicular to the rolling and the normal direction) to be referred to as T-texture, hereinafter).

FIG. 1 each show how to show a c axis orientation being the normal direction of the (0001) plane being a basal plane of a hexagonal HCP structure in a titanium α phase. An angle between the ND axis (the normal direction of the sheet plane) and the c axis is set to θ. Further, an angle between a line obtained by projecting the c axis onto the plane of the sheet and the TD axis (the sheet width direction) is set to φ. B-texture described above can be expressed that the c axis is oriented in the direction close to the ND axis and particularly no polarization exists in the sheet plane, so that the angle θ is small and the angle φ falls in the entire circumference of −180 degrees to 180 degrees. Further, T-texture described above can be expressed that the c axis is oriented in the direction close to the TD axis, so that the angle θ is near 90 degrees and the angle φ falls near 0 degree or near 180 degrees. Further, in FIG. 1(a) and FIG. 1(b), the direction described as the RD axis (the rolling direction) is also described as the sheet longitudinal direction, hereinafter. In Non-Patent Document 1, it is described that the pure titanium is heated to a β temperature region and is unidirectionally rolled in an α temperature region, to thereby form a texture similar to T-texture. However, in Non-Patent Document 1, no explanation on an α+β type titanium alloy sheet is given. Further, in Non-Patent Document 1, no examination on effects of improvement of pipe-making properties and the like is made.

Further, in Patent Document 8, there is described a technique of starting hot rolling in a β temperature region with regard to pure titanium. This is to prevent occurrence of wrinkles and scratches by making crystal grains fine. However, in Patent Document 8 as well, no explanation on an α+β type titanium alloy sheet is given.

Further, in Patent Document 9, there is disclosed a titanium alloy containing Fe—Al. In Patent Document 10, there is disclosed a titanium alloy for golf club head containing Fe and Al, and it is described that a Young's modulus is controlled by a final heat treatment. However, in Patent Document 9, no evaluation of a texture and no examination on anisotropy in mechanical properties are made. Further, in Patent Document 10 as well, no examination is made on an effect of control of material anisotropy in a sheet plane of a hot-rolled sheet to be performed by making a texture based on hot rolling condition control.

That is, conventionally, there are no disclosures of technique related to an α+β type titanium alloy sheet capable of being worked with good pipe-making properties such that a high-strength α+β type titanium alloy pipe having an axial direction strength of 1050 MPa or more is made by forming a thin sheet material to round shape, and a high-strength α+β type titanium alloy pipe product using it.

Here, in Patent Document 11, there is disclosed a technique of increasing bendability by developing T-texture in an α+β type alloy. Further, in Patent Document 12, there is disclosed a method of manufacturing parts having high rigidity in an axial direction by machining automobile parts such as a connecting rod and an engine valve so that the axial direction corresponds to the sheet width direction by utilizing the property of the sheet where tensile strength and a Young's modulus are increased in the sheet width direction of an α+β type alloy hot-rolled plate with developed T-texture. However, there still is room to consider the conditions of hot rolling for improving the pipe-making properties, the strength and the rigidity in the pipe longitudinal direction.

PRIOR ART DOCUMENT

Patent Document

Patent Document 1: Japanese Laid-open Patent Publication No. H9-228014
Patent Document 2: Japanese Laid-open Patent Publication No. H02-34752
Patent Document 3: Japanese Laid-open Patent Publication No. 2001-115222
Patent Document 4: Japanese Laid-open Patent Publication No. 2000-158141
Patent Document 5: Patent Publication No. 4486530
Patent Document 6: Patent Publication No. 4516440
Patent Document 7: Japanese Laid-open Patent Publication No. 2007-270199
Patent Document 8: Japanese Laid-open Patent Publication No. S61-159562
Patent Document 9: Japanese Laid-open Patent Publication No. H07-62474
Patent Document 10: Japanese Laid-open Patent Publication No. 2005-220388
Patent Document 11: Japanese Laid-open Patent Publication No. S59-215450
Patent Document 12: Patent Publication No. 04855555

Non-Patent Document

Non-Patent Document 1: "Titanium" Vol. 54, No. 1, page 42 to 51 issued by The Japan Titanium Society on Apr. 28, 2006

SUMMARY OF THE INVENTION

Problems to be Solved by the Invention

The present invention has been made in context of the above circumstances. The present invention is that a sheet-shaped material with in-plane material anisotropy increased by developing a texture is used, and in manufacturing a welded pipe by bending the sheet-shaped material to butt-weld both edge portions thereof, forming and welding are performed in such a manner that the sheet width direction of the sheet material becomes the longitudinal direction of the pipe and the longitudinal direction of the sheet material becomes the circumference direction of the pipe. The present invention has an object to provide a high-strength α+β type titanium alloy sheet having improved pipe-making properties and a manufacturing method thereof. Further, the present invention has an object to provide an α+β type titanium alloy pipe product high in strength and rigidity in the pipe longitudinal direction manufactured by the method.

Means for Solving the Problems

In order to solve the above-described tasks, the present inventors have repeated earnest investigations by focusing on a texture of an α+β type titanium alloy sheet and have found out that by developing and stabilizing T-texture in the sheet ductility in the sheet longitudinal direction is improved. Further, the present inventors have repeated earnest investigations in order to evaluate the degree of stability of T-texture. Then, they have found out that in an α+β type titanium alloy sheet having improved ductility in the sheet longitudinal direction and having sufficiently developed and stable T-texture, the texture in the sheet plane direction has: a first group of grains oriented in a region where of a (0002) pole figure of an α phase having a hexagonal crystal structure, an angle θ being the angle between a c axis and the sheet normal direction is 0 to 30°; and a second group of grains oriented in a region where the angle θ is 80 to 100° and of the (0002) pole figure of the α phase, an angle ϕ being the angle between a projection line of the c axis onto the sheet plane and the sheet width direction is −10 to 10°, and a ratio of peak values of X-ray relative intensities from a basal plane in the α phase between the first group of grains and the second group of grains (the second group of grains/ the first group of grains) becomes 5.0 or more, and have reached the present invention.

Further, the present inventors have advanced earnest studies and have repeated examinations on a manufacturing method of the α+β type titanium alloy sheet in consideration of an evolving process of the texture. As a result, they have found out that a titanium alloy is uni-directionally hot rolled, and thereby T-texture appears and the strength in the sheet width direction increases extremely, and by setting this direction to the pipe longitudinal direction, it is possible to significantly increase the strength and the rigidity in the pipe axis direction. This is because when a β phase is transformed into an α phase, the Burgers relationship is satisfied and the crystal orientation relationship is maintained, but hot rolling is performed uni-directionally to increase the orientation of the β phase, and thereby the c axis in the α phase is likely to be orientated in the sheet width direction (T-texture is generated and develops) during β/α transformation.

Further, the present inventors have found out that when the pipe is made by forming and placing the sheet having the above-described developed texture with the longitudinal direction of the sheet set to the circumference direction of the pipe, deformation stress becomes low and the pipe-making properties are improved. This is because by the development of T-texture, in the longitudinal direction of the sheet, the strength decreases and the ductility improves as will be described below, and thus by setting the direction to the circumference direction of the pipe, bendability in the circumference direction improves.

In pure titanium, in B-texture and in T-texture, yield stresses in the sheet width direction greatly differ, but yield stresses in the sheet longitudinal direction hardly differ. In an α+β type titanium alloy higher in strength than pure titanium, however, when T-texture is stabilized, the strength in the longitudinal direction decreases actually. This is ascribable to the fact that when titanium is cold worked at a temperature near room temperature such as cold rolling, the main slip plane is limited in the basal plane, and in pure titanium, in addition to slip deformation, twinning deformation with the direction close to the c axis of the HCP set to the twinning direction also occurs, and thus plastic anisotropy is small as compared to that of a titanium alloy. In the α+β type titanium alloy having the content of O higher than that of pure titanium and/or containing Al and so on, the twinning deformation is suppressed and the slip deformation predominates, so that with the formation of the texture, the basal plane is oriented in a certain direction and thereby the material anisotropy in the sheet plane is further promoted. In this way, in the α+β type titanium alloy, by the stabilization of T-texture, in the sheet longitudinal direction, the strength decreases and the ductility improves, and thus by setting this direction to the circumference direction of the pipe, the deformation stress during forming the sheet into the shape of a pipe decreases and the pipe-making properties improve.

Further, the present inventors have found out that in the α+β type titanium alloy, a reheating temperature prior to hot rolling capable of obtaining strong T-texture is in an appropriate temperature range of a β single-phase region, and it is more effective that hot rolling is started in the β single-phase region, in an α+β two-phase region, heavy reduction is applied and hot rolling is performed to increase the total reduction ratio. As described above, this is because during β/α phase transformation, the crystal orientation relationship satisfying the Burgers relationship is maintained, but the orientation of the β phase is increased during hot rolling and T-texture further develops. At this time, when in the β single-phase region, a certain amount of deformation is applied during hot rolling, the orientation of the α phase is likely to accumulate to a certain direction during the β/α transformation in the subsequent α+β two-phase region is increased and T-texture is more likely to develop. Here, the deformation stress of the α+β alloy containing several percent or more of Al is high conventionally, so that it is difficult to manufacture a thin sheet product by uni-directional hot rolling. Particularly, as compared to a round bar product, when a thin sheet material is hot rolled, edge cracking is likely to occur due to a decrease in temperature of edge portions of the sheet, resulting in that it is extremely difficult to hot roll the α+β type titanium alloy thin sheet by applying a large reduction ratio. In the present invention, however, titanium alloys are heated to the high-temperature β single-phase region where hot deformation resistance decreases, and thereby good hot workability is maintained, and the reduction ratio in the high-temperature range in the α+β region is increased to control a heat build-up by hot rolling. As a result, hot rolling close to isothermal rolling is made possible, a decrease in temperature of the both edge portions during hot rolling tends to decrease, and an effect that edge cracking does not easily occur is also found. At this time, in order to make rolling in a state close to isothermal rolling possible, relatively heavy reduction is desirably applied at a temperature in the α+β two-phase region.

Further, the present inventors have found out that by optimizing combination of alloying elements and amounts of alloying elements, and by selecting appropriate heating conditions, T-texture further develops, thereby making it possible to enhance the above-described effects, and it is possible to obtain 1050 MPa or more of tensile strength and 130 GPa or more of Young's modulus in the pipe longitudinal direction.

The present invention is as follows.

[1]

An α+β type titanium alloy sheet for welded pipe being an α+β type titanium alloy sheet to be used for a welded pipe with a rolling direction set to a circumference direction, the α+β type titanium alloy sheet for welded pipe includes:

a composition containing, in mass %, 0.8 to 1.5% of Fe, 4.8 to 5.5% of Al, 0.020% or less of N, O in a range satisfying Q=0.14 to 0.38 shown in Expression (1) below, and a balance being composed of Ti and impurities, in which a texture in a sheet plane direction has: a first group of grains oriented in a region where of a (0002) pole figure of an α phase having a hexagonal crystal structure, an angle θ being the angle between a c axis and a sheet normal direction is 0 to 30°; and a second group of grains oriented in a region where the angle θ is 80 to 100° and of the (0002) pole figure of the α phase, an angle ϕ being the angle between a projection line of the c axis onto the sheet plane and a sheet width direction is −10 to 10°, and a ratio of peak values of X-ray relative intensities from a basal plane in the α phase between the first group of grains and the second group of grains (the second group of grains/the first group of grains) is 5.0 or more.

$$Q=[O]+2.77\times[N] \quad (1)$$

In Expression (1) above, [O] represents the content of O [mass %] and [N] represents the content of N [mass %].

[2]

A manufacturing method of an α+β type titanium alloy sheet for welded pipe, includes:

a hot rolling step in which a slab having a composition containing, in mass %, 0.8 to 1.5% of Fe, 4.8 to 5.5% of Al, 0.020% or less of N, O in a range satisfying Q=0.14 to 0.38 shown in Expression (1) below, and a balance being composed of Ti and impurities is heated to a reheating temperature prior to hot rolling of not lower than a β transus nor higher than the β transus+150° C. and then is subjected to uni-directional hot rolling by setting a reduction in sheet thickness in an α+β region to 80% or more out of the total reduction in sheet thickness of 90% or more and by setting a hot rolling finishing temperature to not lower than the β transus–250° C. nor higher than the β transus–50° C.

$$Q=[O]+2.77\times[N] \quad (1)$$

In Expression (1) above, [O] represents the content of O [mass %] and [N] represents the content of N [mass %].

[3]

An α+β type titanium alloy welded pipe product made by using the α+β type titanium alloy sheet material for welded pipe according to [1] to make a pipe with a width direction of the sheet set to a longitudinal direction of the pipe and a longitudinal direction of the sheet set to a circumference direction of the pipe, in which in the pipe longitudinal direction, tensile strength exceeds 1050 MPa and a Young's modulus exceeds 130 GPa.

Effect of the Invention

According to the present invention, it is possible to provide an α+β type titanium alloy sheet for welded pipe suitable for manufacture of a welded pipe excellent in pipe-making properties and excellent in strength and rigidity in a pipe longitudinal direction.

MODE FOR CARRYING OUT THE INVENTION

The present inventors have thoroughly examined effects of a texture in a sheet plane on pipe-making properties of an α+β type titanium alloy sheet for welded pipe in order to solve the above-described tasks. As a result, they have found out that by stabilizing T-texture, in the sheet longitudinal direction, deformation stress is decreased and ductility is improved, and thus during manufacturing a welded pipe, a sheet material is bent so that the longitudinal direction of the sheet may become the circumference direction of the pipe, bendability of the sheet material improves. Further, at that time, in the sheet width direction, the strength increases and the Young's modulus increases, so that in the pipe longitudinal direction, a property having high strength and high rigidity is exhibited. The present invention has been made based on these findings.

Figure 1:
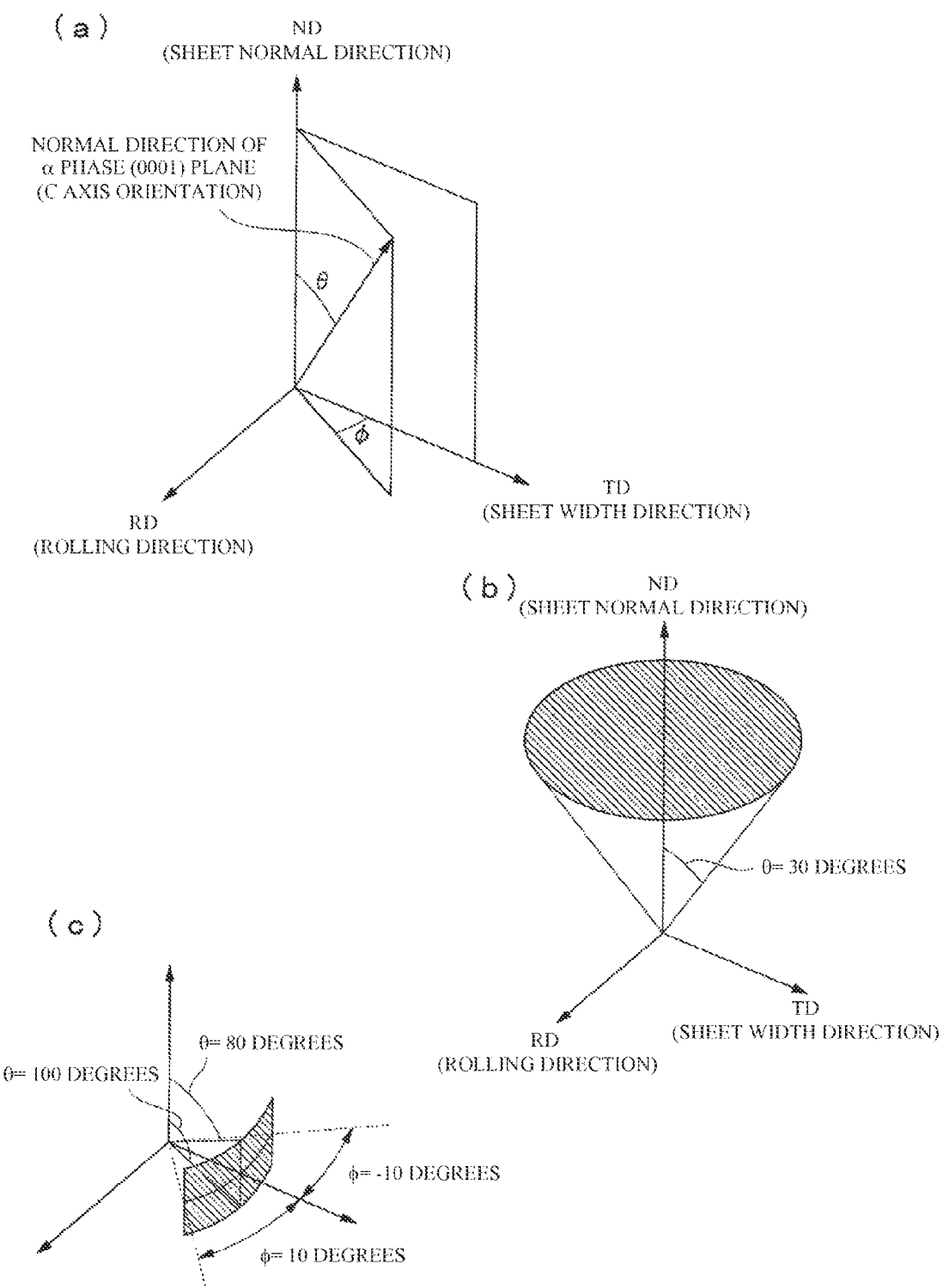
FIG. 1 is view explaining crystal orientation of an α+β type titanium alloy sheet.

Hereinafter, there will be described reasons for limiting a texture of a titanium α phase in the present invention. First, there will be explained how to show crystal orientations in a texture of an α+β type titanium alloy sheet in the present invention again by using FIG. 1(a), FIG. 1(b), and FIG. 1(c). The important thing in the present invention is the orientation of a c axis being the normal of the (0001) plane being a six-fold symmetry crystal plane of the titanium α phase, namely a phase having a hexagonal crystal (HCP) structure. As shown in FIG. 1(a), an angle between the c axis and the sheet normal direction (ND) is set to an angle θ and an angle between a projection line of the c axis onto the sheet plane and the sheet width direction (TD) is set to an angle φ. When the projection line coincides with the TD, the angle φ=0 is set.

In the α+β type titanium alloy, low strength and high ductility in the sheet longitudinal direction and high strength in the sheet width direction are obtained when T-texture develops strongly. The present inventors have advanced earnest examinations on alloy designing to develop T-texture, and have solved them as follows.

Figure 2:
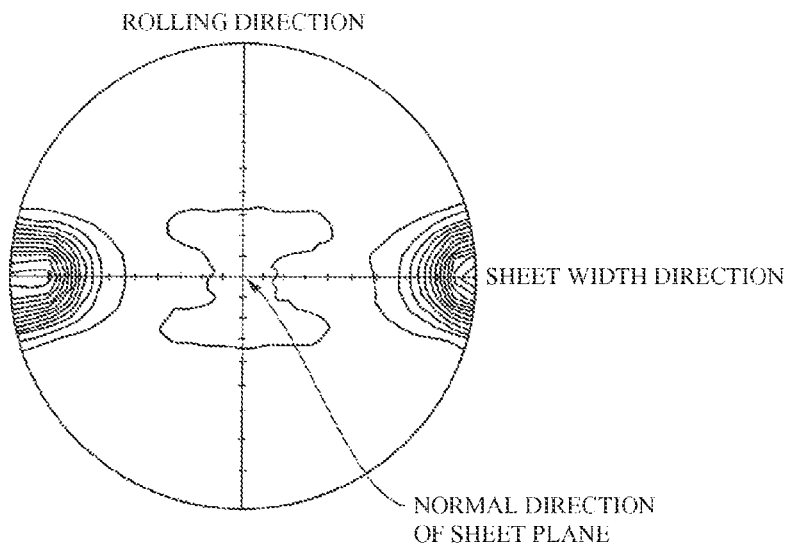
FIG. 2 is an example of a (0002) pole figure of a titanium α phase.

First, the degree of development of the texture is evaluated by using a ratio of peak values of X-ray relative intensities from a basal plane of an α phase obtained by an X-ray diffraction method. FIG. 2 shows an example of a (0002) pole figure showing integrated orientations of the basal plane of the α phase (HCP). This (0002) pole figure is a typical example of T-texture, and the c axis is strongly orientated in the sheet width direction.

Such a texture is characterized by taking a ratio between the integration degree of first group of grains with the c axis oriented in the ND mainly and the integration degree of second group of grains with the c axis oriented in the TD mainly. That is, there is obtained XND being the strongest intensity (the peak value of the X-ray relative intensities) among X-ray (0002) reflections from the basal plane of the α phase in the first group of grains oriented in a region where of the (0002) pole figure of the α phase, the angle θ being the angle between the c axis and the sheet normal direction (ND) is, as shown in the hatching portion in FIG. 1(b), 0 degree to 30 degrees and the angle φ being the angle between the projection line of the c axis onto the sheet plane and the sheet width direction (TD) is –180 to 180° (the whole circumference).

Further, there is obtained XTD being the strongest intensity (the peak value of the X-ray relative intensities) among X-ray (0002) reflections from the second group of grains oriented in a region where of the (0002) pole figure of the α phase, the angle θ being the angle between the c axis and the sheet normal direction (ND) is, as shown in the hatching portion in FIG. 1(c), 80 degrees to 100 degrees and the angle φ is –10 to 10°.

Next, the ratio of them (XTD/XND (the second group of grains/the first group of grains)) is obtained. This ratio (XTD/XND) is called an X-ray anisotropy index, and with this, the stability of T-texture can be evaluated.

Figure 3:
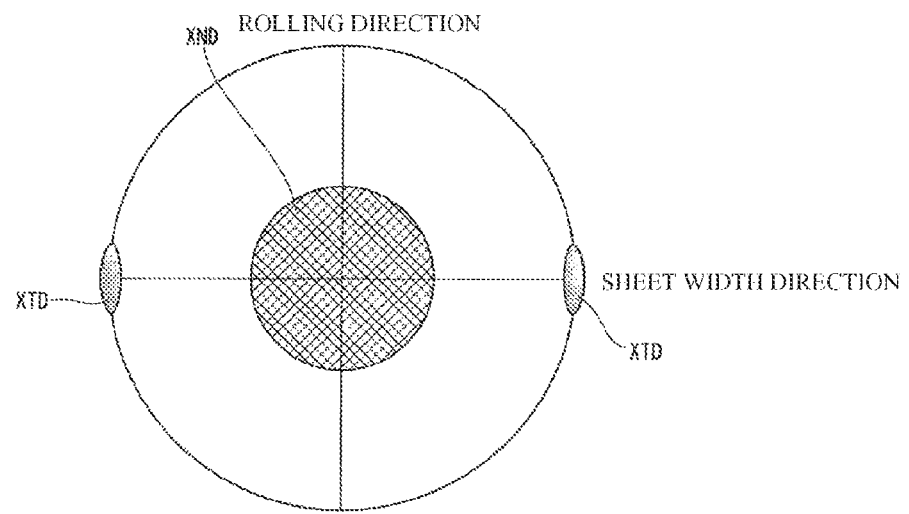
FIG. 3 is a schematic view showing measurement positions of XTD and XND in the (0002) pole figure of the titanium α phase.

Such an X-ray anisotropy index (XTD/XND) in the (0002) pole figure of the α phase is evaluated on various titanium alloy sheets. FIG. 3 schematically shows measurement positions of XTD and XND.

Figure 4:
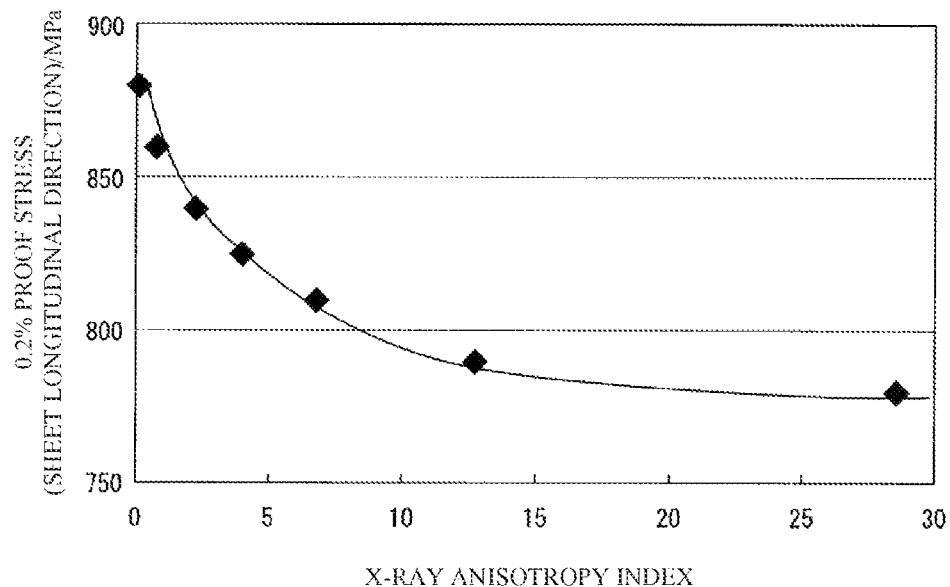
FIG. 4 is a graph showing the relationship between an X-ray anisotropy index and 0.2% proof stress in a sheet longitudinal direction (a rolling direction)

Further, the X-ray anisotropy index is associated with bendability in the sheet longitudinal direction. As an index of bendability in bending a sheet into a pipe shape, 0.2% proof stress in the bending direction (=the sheet longitudinal direction, namely the rolling direction) is used. As this value is smaller, the sheet becomes more likely to be bent and becomes more likely to be made into a pipe.

α+β type titanium alloy sheets each containing 1.1 mass % of Fe and 0.25 mass % of O are used to be subjected to unidirectional hot rolling under various hot rolling conditions or cross rolling, and thereby materials exhibiting various X-ray anisotropy indices are prepared. These materials are each machined into a sheet-type tensile test piece of JIS13B, and their 0.2% proof stress in the sheet longitudinal direction obtained in a tensile test is shown with respect to the X-ray anisotropy index in FIG. 4. As shown in FIG. 4, as the X-ray anisotropy index becomes higher, the 0.2% proof stress in the sheet longitudinal direction becomes lower.

The same α+β type titanium alloy sheets as those used for the measurement of the 0.2% proof stress in making the graph shown in FIG. 4 are also used, and their deformation stress and bendability when the longitudinal direction of the sheet is bent into a pipe shape are examined. As a result, it has found out that when the 0.2% proof stress becomes 820 MPa or less, the deformation stress during bending decreases and the bendability improves dramatically. The X-ray anisotropy index when the 0.2% proof stress becomes 820 MPa or less is 5.0 or more.

Further, the same α+β type titanium alloy sheets as those used for the measurement of the 0.2% proof stress in making the graph shown in FIG. 4 are also used, and the sheets are each bent in the longitudinal direction of the sheet by press working to TIG-weld both edges of each of the sheets to manufacture welded pipes. Obtained pipe test pieces are used, and their relationship between tensile strength (TS) in the pipe longitudinal direction obtained by the tensile test and the X-ray anisotropy index is examined. Results thereof are shown in FIG. 5.

Figure 5:
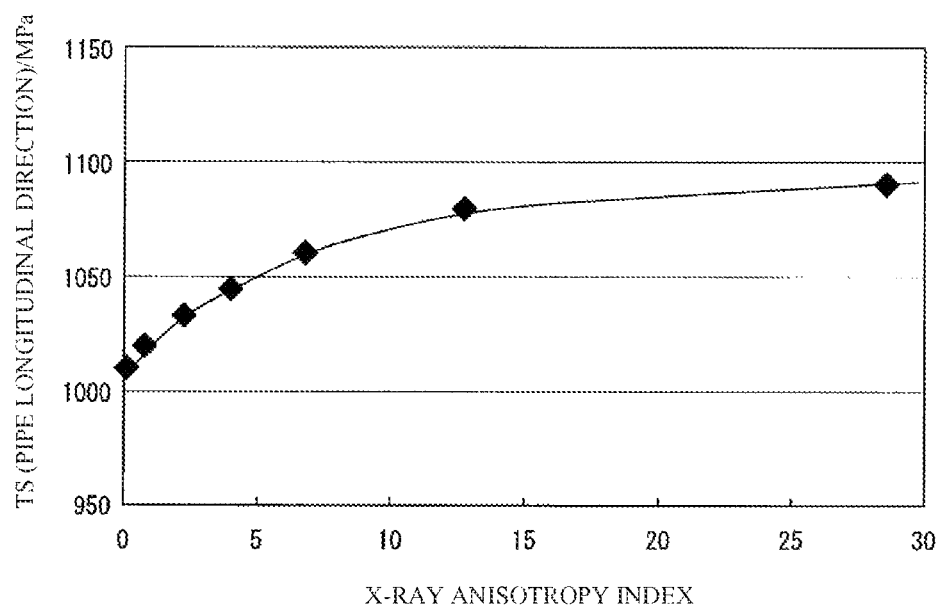
FIG. 5 is a graph showing the relationship between the X-ray anisotropy index and tensile strength (TS) in a pipe longitudinal direction (an axial direction).

As shown in FIG. 5, as the X-ray anisotropy index becomes larger, the tensile strength in the pipe longitudinal direction increases. When the X-ray anisotropy index becomes 5.0 or more, 1050 MPa or more of the tensile strength required for the pipe to be used as frames of high-grade motorcycles, strength members of automobiles, and the like is obtained.

Further, when the X-ray anisotropy index of the α+β type titanium alloy becomes 5.0 or more, in the width direction of the α+β type titanium alloy sheet, the Young's modulus greater than 130 GPa is obtained.

Based on these findings, the ratio of the peak values of the X-ray relative intensities (peaks) from the basal plane of the α phase between the first group of grains and the second group of grains (the second group of grains/the first group of grains) (the X-ray anisotropy index) is limited to 5.0 or more. Further, the X-ray anisotropy index is preferably 7.5 or more for obtaining more excellent bendability, tensile strength, and Young's modulus. Further, there is sometimes a case that the X-ray intensity of the first group of grains becomes extremely small, that is, grains belonging to the first group are decreased extremely, and in this case, the X-ray anisotropy index sometimes becomes extremely large to diverge. Thus, the upper limit of the X-ray anisotropy index is not set.

Next, there will be explained the chemical composition of the α+β type titanium alloy sheet for welded pipe of the present invention. The α+β type titanium alloy sheet for welded pipe of the present invention contains alloying elements to be described below, to thus obtain superior pipe-making properties such as mainly the bendability during bending a sheet into a pipe shape to manufacture a welded pipe particularly and obtain high strength and rigidity in the pipe longitudinal direction. Hereinafter, there will be explained reasons for selecting alloying elements for the α+β type titanium alloy sheet for welded pipe of the present invention and reasons for limiting the ranges of alloying elements.

Fe is an inexpensive additive element among β stabilizing elements and has a function of solid solution strengthening a β phase. In order to obtain strong T-texture in a hot-rolled texture for improving the bendability during bending the sheet into a pipe shape, it is necessary to obtain an appropriate volume fraction of β phase stable at a reheating temperature prior to hot rolling. Fe has strong β phase stabilizing ability compared to the other β phase stabilizing elements. An amount of Fe can be decreased as compared to the other β phase stabilizing elements, the solid solution strengthening at room temperature by Fe is not increased so much, and high ductility can be maintained, so that it is possible to secure bendability. In order to stabilize the β phase in a hot rolling temperature region up to an appropriate volume ratio, it is necessary to add 0.8% or more of Fe. On the other hand, Fe is likely to segregate in Ti during melting and casting, and when Fe is added in large amounts, due to the solid solution strengthening, the ductility decreases, the bendability decreases, and the fraction of β phase with a low Young's modulus increases, to thus cause a decrease in rigidity. In consideration of these effects, the upper limit of the additive amount of Fe is set to 1.5%. The more preferable range of the content of Fe is 0.9 to 1.3%.

Al is a stabilizing element of the titanium α phase, has a high solid solution strengthening ability, and is an inexpensive additive element. In order to obtain 1050 MPa or more of tensile strength in the TD direction, which is a strength level necessary as a high-strength α+β type titanium alloy to be used for high-grade automobile parts, by adding O and N to be described later in a combined manner, the lower limit of the additive amount of Al is set to 4.8%. On the other hand, when Al is added in excess of 5.5%, the deformation stress increases excessively and the ductility decreases, the pipe-making properties of bending deteriorate, and hot deformation stress increases, to thereby cause a decrease in hot workability. Thus, it is necessary to set the additive amount of Al to 5.5% or less. The more preferable range of the content of Al is 4.9 to 5.3%.

N is interstitially solid-dissolved in an α phase and has a function of solid solution strengthening. However, when N is added in excess of 0.020% by a normal method of using titanium sponge containing high concentration of N or the like, low density inclusions called LDI are likely to be generated and the production yield decreases. Therefore, the upper limit is set to 0.020%. The preferable range of the content of N is 0.10% or less.

O is interstitially solid-dissolved in an α phase and has a function of solid solution strengthening, similarly to N. These elements contribute to an increase in strength according to the value of Q shown in the following Expression (1).

It is necessary to contain O in a range satisfying Q=0.14 to 0.38.

$$Q = [O] + 2.77 \times [N] \quad (1)$$

In Expression (1) described above, [O] represents the content of 0 [mass %], and [N] represents the content of N [mass %].

When the value of Q shown in Expression (1) described above is less than 0.14, it is not possible to obtain 1050 MPa or more of tensile strength in the pipe longitudinal direction, which is the tensile strength necessary as high-strength automobile parts, in spite of controlling the texture. Further, when Q exceeds 0.38, the strength increases excessively and the ductility decreases, and a cold rolling property decreases slightly. Thus, the lower limit is set to 0.14 and the upper limit is set to 0.38. The more preferable range of Q is 0.19 to 0.30.

Next, there will be explained an α+β type titanium alloy welded pipe product of the present invention. The welded pipe product of the present invention is made in a manner that the α+β type titanium alloy sheet for welded pipe of the present invention is used, and the width direction of the sheet is set to the longitudinal direction of the pipe and the longitudinal direction of the sheet is set to the circumference direction of the pipe. Thus, the welded pipe product of the present invention becomes excellent in strength and rigidity in the pipe longitudinal direction, where in the pipe longitudinal direction, the tensile strength exceeds 1050 MPa and the Young's modulus exceeds 130 GPa.

Further, a manufacturing method of the present invention relates to a method for particularly developing T-texture, improving the bendability, and increasing the strength and the rigidity in the sheet width direction. The manufacturing method of the present invention is a manufacturing method of the α+β type titanium alloy sheet having the texture in the sheet plane direction, the X-ray anisotropy index, and the titanium alloy components that are described above. The manufacturing method of the present invention includes a hot rolling process in which a slab having a predetermined composition is heated to a reheating temperature prior to hot rolling of not lower than a β transus nor higher than the β transus+150° C. and then is subjected to uni-directional hot rolling by setting a reduction in sheet thickness in an α+β region to 80% or more out of the total reduction in sheet thickness of 90% or more and by setting a hot rolling finishing temperature to not lower than the β transus–250° C. nor higher than the β transus –50° C.

In order to turn the texture in the sheet plane direction of a hot-rolled sheet obtained after the hot rolling step into strong T-texture and to secure high material anisotropy, in the hot rolling process, a slab having a predetermined composition is heated to the reheating temperature prior to hot rolling in a β single-phase region and is held for, for example, 30 minutes or longer, to thereby be once brought into a β single-phase state. Thereafter, from the reheating temperature prior to hot rolling to the hot rolling finishing temperature in a high-temperature region of an α+β dual-phase, it is necessary to perform the uni-directional hot rolling to apply heavy reduction in sheet thickness in the α+β region of 80% or more out of the total reduction in sheet thickness of 90% or more.

Incidentally, the β transus can be measured by a differential thermal analysis. By use of test pieces that have been made by vacuum melting and forging 10 or more kinds of materials each in a small amount of the laboratory level, where the chemical composition containing Fe, Al, N and O is changed within the range of the chemical composition to be made, their β/α transformation starting temperature and their transformation finishing temperature are previously examined by using a differential thermal analysis of gradually cooling each of the test pieces from the β single-phase region of 1150° C. Then, at the time of actual manufacture, whether the temperature is in the β single-phase region or in the α+β region can be judged on the spot by the chemical composition and successive temperature measurement with a radiation thermometer of the made material. Incidentally, the temperatures of the slab and the α+β type titanium alloy sheet are measured with radiation thermometers each disposed between stands of a hot rolling mill. Further, when the temperature of a material to be hot rolled (the slab and the α+β type titanium alloy sheet) at the entrance of each stand is in the α+β two-phase region, it is determined that the material to be hot rolled has been hot rolled in the α+β two-phase region at the stand. The sheet thickness reduction at the stand is measured as a sheet thickness reduction in the α+β region.

When the reheating temperature prior to hot rolling is lower than the β transus, namely is in the α+β dual-phase region, or further the hot rolling finishing temperature is lower than the β transus−250° C., β/α phase transformation often occurs in the middle of the hot rolling and strong reduction is as a result applied in a state of the volume fraction of α phase being high. Consequently, the reduction performed in β single-phase region or in a dual-phase region composed of high volume fraction of β phase becomes insufficient, so that T-texture does not develop sufficiently. Further, when the hot rolling finishing temperature becomes lower than the β transus−250° C., the hot deformation stress increases rapidly and the hot workability decreases, so that edge cracking and so on often occur to cause a problem of a decrease in production yield. Thus, it is necessary to set the lower limit of the reheating temperature prior to hot rolling to the β transus and to set the lower limit of the hot rolling finishing temperature to the β transus−250° C. or higher.

At this time, when the reduction in sheet thickness from the β single-phase region to the α+β dual-phase region (from the reheating temperature prior to hot rolling to the hot rolling finishing temperature) is less than 90%, strain introduced by hot rolling is not sufficient and thus strain is not easily introduced throughout the whole sheet thickness uniformly. Therefore, the orientation of the β phase cannot be obtained throughout the whole sheet thickness and T-texture does not sometimes develop. Particularly, when the reduction in sheet thickness in the α+β region is less than 80%, the orientation of the β phase cannot be accumulated sufficiently and crystal orientations of the α phase to be generated by transformation are randomized partially. As a result, T-texture does not develop to such an extent that high in-plane anisotropy in mechanical properties of the sheet, (which is high in-plane anisotropy in the sheet such that the bendability in the sheet longitudinal direction is improved to create superior pipe-making properties and the rigidity in the sheet width direction, namely in the axial direction after pipe making increases), is created. Thus, in the hot rolling process, the reduction in sheet thickness needs to be 90% or more, and the reduction in sheet thickness in the α+β region needs to be 80% or more.

Further, when the reheating temperature prior to hot rolling exceeds the β transus+150° C., β grains become coarse rapidly. In this case, the hot rolling is mostly performed in the β single-phase region, the coarse β grains are extended in the rolling direction, and therefrom, β/α phase transformation occurs, resulting in that T-texture cannot develop easily. At the same time, the surface of the material for hot rolling is heavily oxidized to cause a manufacturing problem such that scabs and scratches are likely to be formed on the surface of the sheet after the hot rolling. Thus, as for the region of the reheating temperature prior to hot rolling, the upper limit should be the β transus+150° C. and the lower limit should be the β transus.

On the other hand, when the hot rolling finishing temperature at the hot rolling exceeds the β transus−50° C., most of the hot rolling is performed in the β single-phase region and thereby an initial structure is composed of coarse β grains, so that strain is introduced in a non-uniform manner by hot rolling due to crystal orientations of the β grains. Thereby, this cause a problem that orientation integration in the α phase after the β/α transformation is not sufficient and the α phase having random crystal orientations is partially generated, and thus T-texture does not develop easily. Thus, the upper limit of the hot rolling finishing temperature needs to be the β transus−50° C. Therefore, the hot rolling finishing temperature needs to be in a temperature region of not lower than the β transus−250° C. nor higher than the β transus−50° C.

Further, in the hot rolling process under the above-described conditions, the temperature is high compared to that of the heating and hot rolling in the α+β region which is conventional and typical hot rolling process of the α+β type titanium alloy sheet, so that a decrease in temperature at both edges of the sheet is suppressed. As above, there are advantages such that good hot workability is maintained even at the both edges of the sheet and occurrence of edge cracking is suppressed.

Incidentally, the uni-directional hot rolling, in which materials are consistently hot rolled only in one direction from the start to the end of the hot rolling, is performed. This is because when the sheet width direction is set to the pipe longitudinal direction and the sheet is formed into the shape of a pipe by being bent to manufacture the welded pipe, the deformation stress during bending is decreased and the bendability is improved, which are intended in the present invention, and T-texture that makes the strength and the Young's modulus in the pipe longitudinal direction high can be obtained efficiently. Thereby, it becomes possible to obtain the α+β type titanium alloy sheet for welded pipe that has low strength in the sheet longitudinal direction, is easily formed into a pipe shape by being bent, is excellent in pipe-making properties, and further is high in strength and Young's modulus in the pipe longitudinal direction.

Incidentally, in the manufacturing method of the α+β type titanium alloy sheet for welded pipe of the present invention, annealing corresponding to recovery heat treatment may also be performed after the above-described hot rolling step. By performing annealing, a decrease in proof stress in the longitudinal direction is obtained, and thereby bendability in pipe making improves and further it is possible to obtain good pipe-manufacturing properties. However, when annealing is performed at high temperature for a long time, the hot-rolling texture is destroyed and the strength in the sheet width direction decreases. Thus, when the annealing is performed, holding is preferably performed in the range of 700 to 900° C. for 30 minutes or shorter.

Further, the α+β type titanium alloy sheet manufactured by the manufacturing method of the α+β type titanium alloy sheet for welded pipe of the present invention is bent into a pipe shape with the sheet width direction set to the longitudinal direction of the pipe and the sheet longitudinal direction set to the circumference direction of the pipe and butt portions thereof are welded to make a pipe, and thereby it is possible to obtain a high-strength α+β type titanium alloy welded pipe product excellent in strength and rigidity in the pipe longitudinal direction, in which in the pipe longitudinal direction, the tensile strength exceeds 1050 MPa and the Young's modulus exceeds 130 GPa.

EXAMPLE

Example 1

Titanium materials having chemical compositions shown in Table 1 were melted and cast by a vacuum arc melting method into ingots and the ingots were subjected to slabbing to form slabs, and the slabs were heated to a reheating temperature prior to hot rolling of 1070° C. and then were hot rolled with a reduction in sheet thickness of 97.5% to form hot-rolled sheets each having a thickness of 3.5 mm. A hot rolling finishing temperature was 840° C. and a reduction in sheet thickness in the α+β region was 85%. Incidentally, in Test numbers 3 to 14 shown in Table 1, uni-directional hot rolling was performed in a hot rolling process. In Test numbers 1 and 2, not only rolling in the sheet longitudinal direction but also rolling in the sheet width direction was performed in the hot rolling process.

TABLE 1

| TEST NUMBER | Al (MASS %) | Fe (MASS %) | O (MASS %) | N (MASS %) | Q (MASS %) | β TRANSUS (° C.) | X-RAY ANISOTROPY INDEX (XTD/XND) | 0.2% PROOF STRESS IN SHEET LONGITUDINAL DIRECTION (MPa) | TENSILE STRENGTH IN PIPE LONGITUDINAL DIRECTION (MPa) | YOUNG'S MODULUS IN PIPE LONGITUDINAL DIRECTION (GPa) | NOTE |
|---|---|---|---|---|---|---|---|---|---|---|---|
| 1 | 4.9 | 0.9 | 0.16 | 0.005 | 0.17 | 1001 | 0.05 | 876 | 990 | 118 | COMPARATIVE EXAMPLE |
| 2 | 5.1 | 1.2 | 0.15 | 0.005 | 0.16 | 997 | 1.58 | 843 | 1034 | 121 | COMPARATIVE EXAMPLE |
| 3 | 3.7 | 1.3 | 0.18 | 0.004 | 0.19 | 970 | 5.61 | 801 | 1022 | 128 | COMPARATIVE EXAMPLE |
| 4 | 4.8 | 1.3 | 0.18 | 0.004 | 0.19 | 994 | 7.88 | 795 | 1078 | 136 | PRESENT INVENTION |
| 5 | 5.3 | 1.3 | 0.18 | 0.004 | 0.19 | 1004 | 8.33 | 797 | 1123 | 137 | PRESENT INVENTION |

TABLE 1-continued

| TEST NUMBER | Al (MASS %) | Fe (MASS %) | O (MASS %) | N (MASS %) | Q (MASS %) | β TRANSUS (° C.) | X-RAY ANISOTROPY INDEX (XTD/XND) | 0.2% PROOF STRESS IN SHEET LONGITUDINAL DIRECTION (MPa) | TENSILE STRENGTH IN PIPE LONGITUDINAL DIRECTION (MPa) | YOUNG'S MODULUS IN PIPE LONGITUDINAL DIRECTION (GPa) | NOTE |
|---|---|---|---|---|---|---|---|---|---|---|---|
| 6 | 6.1 | 1.3 | 0.18 | 0.004 | 0.19 | 1021 | 9.79 | 834 | 1229 | 140 | COMPARATIVE EXAMPLE |
| 7 | 4.9 | 0.3 | 0.27 | 0.005 | 0.28 | 1024 | 3.42 | 842 | 1033 | 125 | COMPARATIVE EXAMPLE |
| 8 | 4.9 | 0.9 | 0.27 | 0.005 | 0.28 | 1014 | 7.98 | 799 | 1144 | 138 | PRESENT INVENTION |
| 9 | 4.9 | 1.2 | 0.27 | 0.005 | 0.28 | 1008 | 9.05 | 812 | 1187 | 139 | PRESENT INVENTION |
| 10 | 4.9 | 2.0 | 0.27 | 0.005 | 0.28 | 994 | 8.64 | 846 | 1232 | 135 | COMPARATIVE EXAMPLE |
| 11 | 5.2 | 1.0 | 0.09 | 0.001 | 0.09 | 996 | 6.58 | 754 | 1011 | 131 | COMPARATIVE EXAMPLE |
| 12 | 5.2 | 1.0 | 0.17 | 0.001 | 0.17 | 1005 | 7.99 | 779 | 1099 | 137 | PRESENT INVENTION |
| 13 | 5.2 | 1.0 | 0.23 | 0.001 | 0.23 | 1013 | 8.16 | 800 | 1112 | 138 | PRESENT INVENTION |
| 14 | 5.2 | 1.0 | 0.41 | 0.001 | 0.41 | 1033 | 8.32 | 842 | 1286 | 142 | COMPARATIVE EXAMPLE |
| 15 | 4.8 | 1.1 | 0.22 | 0.045 | 0.34 | 1008 | — | — | — | — | COMPARATIVE EXAMPLE |
| 16 | 5.3 | 1.2 | 0.16 | 0.012 | 0.19 | 1004 | 15.13 | 796 | 1119 | 138 | PRESENT INVENTION |
| 17 | 5.0 | 0.9 | 0.32 | 0.014 | 0.36 | 1024 | 19.11 | 815 | 1227 | 143 | PRESENT INVENTION |

Q = [O] + 2.77* [N]

These hot-rolled sheets were pickled to remove surface oxide scales, and tensile test pieces were taken therefrom to examine their tensile properties. Further, of a first group of crystal grains oriented in a region where of a (0002) pole figure of an α phase having a hexagonal crystal structure, an angle θ being the angle between a c axis and the sheet normal direction is 0 to 30° and of a second group of grains oriented in a region where the angle θ is 80 to 100° and of the (0002) pole figure of the α phase, an angle φ being the angle between a projection line of the c axis onto the sheet plane and the sheet width direction is −10 to 10° in a texture in the sheet plane direction, each peak value of X-ray relative intensities from a basal plane in the α phase was measured by an X-ray diffraction method. Then, an X-ray anisotropy index being a ratio of the peak values (the second group of grains (XTD)/the first group of grains (XND)) was calculated, and the degree of development of the texture in the sheet plane direction was evaluated.

Their pipe-making properties were evaluated by using 0.2% proof stress in the sheet longitudinal direction. In the method of making the pipe according to the present invention in which the sheet in the longitudinal direction is bent into a pipe shape to weld butt portions thereof to make a pipe, as long as the 0.2% proof stress in the sheet longitudinal direction becomes 820 MPa or less, plastic working in the sheet longitudinal direction is performed easily, so that the pipe-making properties are good.

Next, these hot-rolled sheets, whose longitudinal direction were each bent into a pipe shape by press bending to TIG-weld butt portions of each of the sheets, and welded pipes each having an outside diameter of 88.9 mm and a wall thickness of 3.5 mm were made. Each actual pipe tensile test piece was taken from these welded pipes, and of the pipe products, each Young's modulus and each tensile strength (JISZ2201) in the longitudinal direction were evaluated. As a pipe product to be used for frames for high-grade motorcycles and bicycles, strength members for automobiles, and the like, the Young's modulus is desirably 130 GPa or more and the tensile strength is desirably 1050 MPa or more. Results of the evaluations of these properties are also shown in Table 1.

In Table 1, Test numbers 1 and 2 each show the result in the α+β type titanium alloy manufactured by the hot rolling process including the hot rolling in the sheet width direction, where the X-ray anisotropy index is less than 5.0. In both Test numbers 1 and 2, the 0.2% proof stress in the sheet longitudinal direction exceeds 820 MPa, the deformation stress during pipe making with the sheet longitudinal direction set to the bending direction is high, and the pipe-making manufacturability is poor. Further, in the pipe longitudinal direction of the manufactured pipe, the tensile strength is less than 1050 MPa and the Young's modulus also does not reach 130 GPa, resulting in that the α+β type titanium alloy is not preferable for the use requiring the strength and rigidity in the pipe longitudinal direction.

In contrast to this, in Test numbers 4, 5, 8, 9, 12, 13, 16, and 17 each being the present invention example manufactured by the manufacturing method of the present invention, the 0.2% proof stress in the sheet longitudinal direction is less than 820 MPa, the deformation stress during bending the sheet in the longitudinal direction is sufficiently low, and the pipe-making properties during bending the longitudinal direction of the sheet to the circumference direction of the pipe are excellent. Further, in the longitudinal direction of the manufactured pipe, the tensile strength is 1050 MPa or more and the Young's modulus exceeds 130 GPa, resulting in that the α+β type titanium alloy exhibits the material properties preferable for the use requiring the strength and rigidity in the pipe longitudinal direction.

On the other hand, in Test numbers 3, 7, 11, the tensile strength in the pipe longitudinal direction after pipe making does not reach 1050 MPa. In Test numbers 3 and 7 among them, the additive amount of Al or Fe falls below the lower limit of the present invention, so that the tensile strength in the pipe longitudinal direction is low. Further, in Test number 11, particularly, the contents of nitrogen and oxygen are small and the value of Q shown in Table 1 falls below the lower limit of the defined amount, so that the tensile strength in the pipe longitudinal direction does not sufficiently reach the high level similarly.

Further, in Test numbers 6, 10, and 14, the X-ray anisotropy index exceeds 5.0, but the 0.2% proof stress in the sheet longitudinal direction exceeds 820 MPa to provide a property to make pipe making difficult. In Test numbers 6, 10, and 14, the additive amount of Fe, the additive amount of Al, and the value of Q are each added in excess of the upper limit of the present invention, so that as the alloy based on these components, the strength increases too much. On the other hand, in Test number 15, many defects occur in many portions of the hot-rolled sheet and the production yield is low, thereby making it impossible to evaluate the properties. This is because N is added in excess of the upper limit of the present invention and thus LDI often occurs.

From the above results, it is possible to confirm that the titanium alloy sheet having the contents of the elements and XTD/XND that are defined in the present invention has strong material anisotropy, and thus the proof stress in the sheet longitudinal direction is low and the deformation stress when bending the sheet in the longitudinal direction to manufacture the pipe is low, and thus the manufacturability of the pipe product is excellent and the tensile strength and the Young's modulus in the pipe longitudinal direction of the pipe product are excellent. When the contents of the elements of the alloy and XTD/XND deviate from the defined values of the present invention, the strong material anisotropy, and the low deformation stress in the sheet longitudinal direction and the high strength and the high Young's modulus in the pipe longitudinal direction of the pipe product that are related to the strong material anisotropy cannot be obtained.

Example 2

Titanium materials having the chemical compositions in Test numbers 4, 8, and 13 in Table 1 were melted and cast into ingots, the ingots were forged to form slabs, the slabs were uni-directionally hot rolled under various conditions shown in Tables 2 to 4, hot rolled sheets were subjected to annealing at 800° C. for 120 seconds, and were pickled to remove surface oxide scales, and then in the same manner as that in Example 1, tensile properties were examined, the X-ray anisotropy index was calculated, and the degree of development of a texture in the sheet plane direction, the 0.2% proof stress in the sheet longitudinal direction, and the Young's modulus and the tensile strength in the longitudinal direction of a pipe product were evaluated. Results of the evaluations of these properties are also shown in Tables 2 to 4. Incidentally, Tables 2, 3, and 4 each show the results of hot-rolled and annealed sheets having the chemical compositions in Test numbers 4, 8, and 13.

TABLE 2

| TEST NUMBER | TOTAL REDUCTION IN SHEET THICKNESS (%) | REDUCTION IN SHEET THICKNESS IN α + β REGION (%) | REHEATING TEMPERATURE PRIOR TO HOT ROLLING (° C.) | HOT ROLLING FINISHING TEMPERATURE (° C.) | X-RAY ANISOTROPY INDEX (XTD/XND) | 0.2% PROOF STRESS IN SHEET LONGITUDINAL DIRECTION (MPa) | TENSILE STRENGTH IN PIPE LONGITUDINAL DIRECTION (MPa) | YOUNG'S MODULUS IN PIPE LONGITUDINAL DIRECTION (GPa) | NOTE |
|---|---|---|---|---|---|---|---|---|---|
| 18 | 93.0 | 82.5 | 1070 | 880 | 7.58 | 802 | 1076 | 137 | PRESENT INVENTION (1), (2), (3) |
| 19 | 96.1 | 90.1 | 1035 | 845 | 10.01 | 787 | 1092 | 137 | PRESENT INVENTION (1), (2), (3) |
| 20 | 81.0 | 70.3 | 1030 | 854 | 3.55 | 826 | 1024 | 128 | COMPARATIVE EXAMPLE |
| 21 | 97.5 | 73.1 | 1120 | 915 | 3.27 | 836 | 1022 | 127 | COMPARATIVE EXAMPLE |
| 22 | 96.2 | 96.2 | 964 | 755 | 4.18 | 830 | 1034 | 128 | COMPARATIVE EXAMPLE |
| 23 | 91.4 | 34.5 | 1178 | 906 | 2.18 | 845 | 1013 | 122 | COMPARATIVE EXAMPLE |
| 24 | 97.0 | 92.1 | 1002 | 720 | 3.01 | 844 | 1026 | 123 | COMPARATIVE EXAMPLE |
| 25 | 94.5 | 20.6 | 1110 | 960 | 1.17 | 855 | 1006 | 121 | COMPARATIVE EXAMPLE |

β TRANSFORMATION POINT IS 994° C.

TABLE 3

| TEST NUMBER | TOTAL REDUCTION IN SHEET THICKNESS (%) | REDUCTION IN SHEET THICKNESS IN α + β REGION (%) | REHEATING TEMPERATURE PRIOR TO HOT ROLLING (° C.) | HOT ROLLING FINISHING TEMPERATURE (° C.) | X-RAY ANISOTROPY INDEX (XTD/XND) | 0.2% PROOF STRESS IN SHEET LONGITUDINAL DIRECTION (MPa) | TENSILE STRENGTH IN PIPE LONGITUDINAL DIRECTION (MPa) | YOUNG'S MODULUS IN PIPE LONGITUDINAL DIRECTION (GPa) | NOTE |
|---|---|---|---|---|---|---|---|---|---|
| 26 | 90.7 | 83.4 | 1100 | 901 | 8.98 | 789 | 1152 | 139 | PRESENT INVENTION (1), (2), (3) |
| 27 | 96.7 | 92.2 | 1050 | 811 | 10.14 | 785 | 1165 | 140 | PRESENT INVENTION (1), (2), (3) |
| 28 | 75.1 | 70.2 | 1065 | 826 | 3.45 | 833 | 1027 | 125 | COMPARATIVE EXAMPLE |
| 29 | 90.9 | 69.2 | 1120 | 930 | 3.89 | 835 | 1031 | 127 | COMPARATIVE EXAMPLE |
| 30 | 91.8 | 91.8 | 960 | 776 | 4.07 | 829 | 1033 | 126 | COMPARATIVE EXAMPLE |
| 31 | 94.0 | 33.9 | 1190 | 955 | 2.55 | 847 | 1022 | 124 | COMPARATIVE EXAMPLE |
| 32 | 94.9 | 91.3 | 1020 | 701 | 3.15 | 835 | 1025 | 125 | COMPARATIVE EXAMPLE |
| 33 | 90.8 | 21.1 | 1090 | 975 | 1.12 | 845 | 1018 | 122 | COMPARATIVE EXAMPLE |

β TRANSFORMATION POINT IS 1014° C.

TABLE 4

| TEST NUMBER | TOTAL REDUCTION IN SHEET THICKNESS (%) | REDUCTION IN SHEET THICKNESS IN α + β REGION (%) | REHEATING TEMPERATURE PRIOR TO HOT ROLLING (° C.) | HOT ROLLING FINISHING TEMPERATURE (° C.) | X-RAY ANISOTROPY INDEX (XTD/XND) | 0.2% PROOF STRESS IN SHEET LONGITUDINAL DIRECTION (MPa) | TENSILE STRENGTH IN PIPE LONGITUDINAL DIRECTION (MPa) | YOUNG'S MODULUS IN PIPE LONGITUDINAL DIRECTION (GPa) | NOTE |
|---|---|---|---|---|---|---|---|---|---|
| 34 | 93.8 | 88.7 | 1100 | 887 | 4.99 | 810 | 1107 | 138 | PRESENT INVENTION (1), (2), (3) |
| 35 | 97.5 | 92.1 | 1065 | 824 | 11.23 | 787 | 1133 | 140 | PRESENT INVENTION (1), (2), (3) |
| 36 | 78.6 | 71.2 | 1020 | 801 | 2.28 | 827 | 1031 | 123 | COMPARATIVE EXAMPLE |
| 37 | 91.3 | 71.8 | 1125 | 950 | 3.16 | 837 | 1036 | 128 | COMPARATIVE EXAMPLE |
| 38 | 92.1 | 92.1 | 960 | 779 | 4.13 | 833 | 1038 | 127 | COMPARATIVE EXAMPLE |
| 39 | 94.0 | 25.9 | 1210 | 950 | 1.28 | 828 | 1022 | 122 | COMPARATIVE EXAMPLE |
| 40 | 95.5 | 91.5 | 1025 | 687 | 3.98 | 835 | 1037 | 125 | COMPARATIVE EXAMPLE |
| 41 | 96.1 | 19.5 | 1130 | 970 | 1.22 | 845 | 1011 | 121 | COMPARATIVE EXAMPLE |

β TRANSFORMATION POINT IS 1013° C.

Among the above, Test numbers 18, 19, 26, 27, 34, and 35 being the examples of the present invention manufactured by the manufacturing method of the present invention each exhibit the 0.2% proof stress of 820 MPa or less in the sheet longitudinal direction and have good pipe-making properties. Further, the made pipe products each have the tensile strength in the longitudinal direction greater than 1050 MPa and the Young's modulus in the longitudinal direction greater than 130 GPa, and thus are excellent in strength and rigidity in the pipe longitudinal direction.

On the other hand, Test numbers 20 to 25, 28 to 33, and 36 to 41 each have the 0.2% proof stress in the sheet longitudinal direction greater than 820 MPa, are poor in pipe-making properties, and do not have strength and rigidity properties sufficient as frames of high-grade motorcycles and strength members for automobiles and the like, where the tensile strength in the pipe longitudinal direction is less than 1050 MPa and the Young's modulus in the pipe longitudinal direction is less than 130 GPa.

Regarding Test numbers 20, 28, and 36 among the above, the total reduction in sheet thickness at hot rolling is lower than the lower limit of the present invention, so that T-texture cannot develop sufficiently, the 0.2% proof stress in the sheet longitudinal direction does not decrease, and the tensile strength and the Young's modulus in the pipe longitudinal direction after pipe making do not increase sufficiently. Regarding Test numbers 21, 29, and 37, the reduction in sheet thickness in the α+β region is lower than the lower limit of the present invention, so that no sufficient development of T-texture is seen, the 0.2% proof stress in the sheet longitudinal direction does not decrease, and the tensile strength and the Young's modulus in the pipe longitudinal direction after pipe making do not increase sufficiently.

In Test numbers 22, 30, and 38, the reheating temperature prior to hot rolling is equal to or lower than the lower limit temperature of the present invention, so that amount of hot working in the β single-phase region is zero and T-texture cannot develop sufficiently. Further, in Test numbers 24, 32, and 40, the hot rolling finishing temperature is equal to or lower than the lower limit temperature of the present invention, so that edge cracking occurs in large amounts.

Further, in Test numbers 23, 31, and 39, the reheating temperature prior to hot rolling exceeds the upper limit temperature of the present invention, and further in Test numbers 25, 33, and 41, the hot rolling finishing temperature exceeds the upper limit temperature of the present invention, so that in all the cases, most of hot working is performed in the β single-phase region, and therefore due to hot rolling of coarse β grains, T-texture does not develop and becomes unstable and a coarse final microstructure is formed, and thereby the 0.2% proof stress in the sheet longitudinal direction does not decrease sufficiently and further the tensile strength and the Young's modulus in the pipe longitudinal direction do not increase sufficiently.

From the above results, it is possible to confirm that for obtaining an α+β type alloy sheet product having the properties of low deformation stress in manufacturing the welded pipe by forming the sheet into a pipe shape to butt-weld both edges thereof, excellent pipe-making properties, and high tensile strength and high Young's modulus in the longitudinal direction of the made welded pipe, the product only needs to be manufactured in a manner that the titanium alloy having the texture and the alloying elements in the component ranges described in the present invention is hot rolled in the ranges of the reduction in sheet thickness, the reheating temperature prior to hot rolling, and the hot rolling finishing temperature described in the present invention, and is made into the pipe with the longitudinal direction of the sheet set to the circumference direction of the pipe.

INDUSTRIAL APPLICABILITY

According to the present invention, it is possible to manufacture an α+β type titanium alloy sheet having good bendability in bending and forming a sheet material into a pipe shape and capable of manufacturing a high-strength titanium alloy welded pipe high in strength and Young's modulus in the pipe longitudinal direction, and a high-strength titanium alloy welded pipe made by using the α+β type titanium alloy sheet. This can be widely used for frames of high-grade motorcycles and bicycles, automobile parts such as strength members of automobiles, consumer products requiring strength and rigidity in the pipe longitudinal direction, and so on.

The invention claimed is:

1. An α+β titanium alloy sheet for welded pipe being an α+β type titanium alloy sheet to be used for a welded pipe with a rolling direction set to a circumference direction, the α+β type titanium alloy sheet for welded pipe comprising:
    a composition containing, in mass %, 0.8 to 1.5% of Fe, 4.8 to 5.5% of Al, 0.020% or less of N, O in a range satisfying Q=0.14 to 0.38 shown in Expression (1) below, and a balance being composed of Ti and impurities, wherein a texture in a sheet plane direction has: a first group of grains oriented in a region where of a (0002) pole figure of an α phase having a hexagonal crystal structure, an angle θ being the angle between a c axis and a sheet normal direction is 0 to 30°; and a second group of grains oriented in a region where the angle θ is 80 to 100° and of the (0002) pole figure of the α phase, an angle φ being the angle between a projection line of the c axis onto the sheet plane and a sheet width direction is −10 to 10°, and a ratio of peak values of X-ray relative intensities from a basal plane in the α phase between the first group of grains and the second group of grains (the second group of grains/the first group of grains) is 5.0 or more, $$Q=[O]+2.77\times[N] \quad (1)$$

wherein [O] represents the content of O [mass %] and [N] represents the content of N [mass %].

2. A manufacturing method of an α+β titanium alloy sheet for welded pipe, comprising:
    a hot rolling step in which a slab having a composition containing, in mass %, 0.8 to 1.5% of Fe, 4.8 to 5.5% of Al, 0.020% or less of N, O in a range satisfying Q=0.14 to 0.38 shown in Expression (1) below, and a balance being composed of Ti and impurities is heated to a reheating temperature prior to hot rolling of not lower than a β transus nor higher than the β transus+150° C. and then is subjected to uni-directional hot rolling by setting a reduction in sheet thickness in an α+β region to 80% or more out of the total reduction in sheet thickness of 90% or more and by setting a hot rolling finishing temperature to not lower than the β transus −250° C. nor higher than the β transus −50° C., $$Q=[O]+2.77\times[N] \quad (1)$$

wherein [O] represents the content of O [mass %] and [N] represents the content of N [mass %],
    wherein β transus is the temperature at which a structure becomes a β-phase single phase, and
    wherein a texture in a sheet plane direction has: a first crystal grain group oriented in a region where of a (0002) pole figure of an α phase having a hexagonal crystal structure, an angle θ being the angle between a c axis and a sheet normal direction is 0 to 30°; and a second crystal grain group oriented in a region where the angle θ is 80 to 100° and of the (0002) pole figure of the α phase, an angle φ being the angle between a projection line of the c axis onto the sheet plane and a sheet width direction is −10 to 10°, and a ratio of peak values of X-ray relative intensities from a basal plane in the α phase between the first crystal grain group and the second crystal grain group (the second crystal grain group/the first crystal grain group) is set to 5.0 or more.

3. An α+β titanium alloy welded pipe product made by using the α+β type titanium alloy sheet for welded pipe according to claim 1 to make a pipe with a width direction of the sheet set to a longitudinal direction of the pipe and a longitudinal direction of the sheet set to a circumference direction of the pipe, wherein
    in the pipe longitudinal direction, tensile strength exceeds 1050 MPa and a Young's modulus exceeds 130 GPa.

* * * * *